(12) United States Patent
Walton et al.

(10) Patent No.: US 9,430,650 B2
(45) Date of Patent: Aug. 30, 2016

(54) METHOD FOR MANAGING MEMORY SPACE IN A SECURE NON-VOLATILE MEMORY OF A SECURE ELEMENT

(75) Inventors: Charles Walton, Marshfield, MA (US); Matthias Lerch, Septemes les Vallons (FR)

(73) Assignee: Inside Secure, Aix-en-Provence (FR)

( * ) Notice: Subject to any disclaimer, the term of this patent is extended or adjusted under 35 U.S.C. 154(b) by 135 days.

(21) Appl. No.: 13/437,124

(22) Filed: Apr. 2, 2012

(65) Prior Publication Data
US 2013/0212407 A1     Aug. 15, 2013

(30) Foreign Application Priority Data
Feb. 9, 2012   (EP) ..................................... 12154724

(51) Int. Cl.
| | | |
|---|---|---|
| *G06F 21/00* | (2013.01) | |
| *G06F 21/60* | (2013.01) | |
| *G06F 21/62* | (2013.01) | |
| *H04L 9/06* | (2006.01) | |
| *G06F 21/64* | (2013.01) | |
| *H04L 9/32* | (2006.01) | |
| *H04L 9/28* | (2006.01) | |

(52) U.S. Cl.
CPC ........... *G06F 21/60* (2013.01); *G06F 21/6209* (2013.01); *G06F 21/64* (2013.01); *H04L 9/0618* (2013.01); *H04L 9/0643* (2013.01); *H04L 9/32* (2013.01); *H04L 9/3244* (2013.01); *G06F 2211/007* (2013.01); *H04L 9/28* (2013.01); *H04L 2209/72* (2013.01)

(58) Field of Classification Search
CPC ............. G06F 21/06; G06F 2211/007; G06F 2211/008; G06F 2212/402; G06F 2221/2107; H04L 9/06; H04L 9/28; H04L 9/32; H04L 63/04; H04L 2209/60; H04L 2209/72
USPC ............. 713/160–181, 189–194; 726/22–30; 380/259–260, 36–43, 28–29
See application file for complete search history.

(56) References Cited

U.S. PATENT DOCUMENTS

| | | | |
|---|---|---|---|
| 5,757,919 A | | 5/1998 | Herbert et al. |
| 6,061,449 A | * | 5/2000 | Candelore et al. ............. 380/28 |
| 6,708,274 B2 | * | 3/2004 | Herbert et al. ................ 713/190 |
| 7,266,690 B2 | * | 9/2007 | Field ............................. 713/165 |
| 7,577,848 B2 | * | 8/2009 | Schwartz et al. ............. 713/187 |

(Continued)

FOREIGN PATENT DOCUMENTS

| | | |
|---|---|---|
| EP | 1978463 A2 | 10/2008 |
| EP | 2405378 A1 | 1/2012 |

OTHER PUBLICATIONS

Extended EP Search Report issued Jul. 6, 2012 in EP Application No. 12154724.4.

*Primary Examiner* — Madhuri Herzog
(74) *Attorney, Agent, or Firm* — Panitch Schwarze Belisario & Nadel LLP

(57) ABSTRACT

The invention relates to a method for managing non-volatile memory space in a secure processor comprising a secure non-volatile internal memory, the method comprising steps of: selecting data elements to remove from the internal memory, generating, by the secure processor, a data block comprising the selected data elements, and a signature computed from the selected data elements using a secret key generated by the secure processor, transmitting the data block by the secure processor, and storing the transmitted data block in an external memory.

23 Claims, 5 Drawing Sheets

(56) References Cited

U.S. PATENT DOCUMENTS

| | | | |
|---|---|---|---|
| 7,783,894 B2* | 8/2010 | Dellow et al. | 713/189 |
| 2005/0081040 A1* | 4/2005 | Johnson et al. | 713/176 |
| 2007/0294496 A1* | 12/2007 | Goss et al. | 711/163 |
| 2008/0244217 A1* | 10/2008 | Baum et al. | 711/173 |
| 2010/0082997 A1* | 4/2010 | Elbaum et al. | 713/180 |
| 2010/0191805 A1* | 7/2010 | Lu et al. | 709/203 |
| 2012/0011572 A1 | 1/2012 | Chew et al. | |

\* cited by examiner

METHOD FOR MANAGING MEMORY SPACE IN A SECURE NON-VOLATILE MEMORY OF A SECURE ELEMENT

BACKGROUND OF THE INVENTION

The present invention generally relates to secure elements such as smart cards inserted into portable devices such as mobile phones. The present invention more particularly relates to memory management on smart cards.

Applications or "applets" (in JavaCard) are now available that can be used to provide a wide range of add-on services and features to portable devices. Development of inductive coupling contactless communication techniques, also called NFC techniques (Near Field Communication), changed the field of chip cards, making it possible first to make contactless payment cards, and then, to integrate a secure processor and an NFC controller into mobile phones, to perform secure near field transactions.

FIG. 1 schematically shows a transaction system including a mobile phone HD and a transaction terminal TT. The phone HD comprises for example a main processor BBP also known as a "base-band" processor, a radiocommunication circuit RCT connected to the processor BBP, an NFC controller referenced "NFCC" also connected to the processor BBP by a link B2, an antenna coil AC1 connected to the controller NFCC, and a secure processor SE configured to perform NFC transactions. The phone HD may also comprise another (external) secure processor, a SIM (Subscriber Identity Module) card and a memory card such as a MicroSD (Micro Secure Digital) card.

The processor SE is connected to or in communication with the processor BBP and comprises a central processing unit CPU, and a secure non-volatile internal memory IM storing an operating system and applications or applets. The processor SE is linked to the controller NFCC through a bus B3, for example a SWP (Single Wire Protocol) bus. In practice, the processor SE may be a Universal Integrated Circuit Card (UICC), for example of the mini-SIM or micro-SIM type.

The controller NFCC comprises a contactless front end interface CLF linked to an antenna circuit AC1. In practice, the controller may be integrated into a semiconductor chip, such as the MicroRead® chip commercialized by the Applicant.

The bus B3 linking the processor SE and the controller NFCC is used as physical support for a communication interface, known as a Host Controller Interface (HCI) in the example of SWP. The controller NFCC and the processor SE exchange data via this interface in accordance with a Host Controller Protocol HCP. The interface HCI and the protocol HCP are described in the ETSI TS 102 622 specifications (European Telecommunications Standards Institute), called "Smart Cards; Universal Integrated Circuit Card (UICC); Contactless Front-end (CLF) interface; Host Controller Interface (HCI)". The protocol HCP specifies the routing of data according to routing channels called "pipes", through which application data are exchanged during a transaction between the processor SE and the transaction terminal TT.

The terminal TT is for example a cash point, a sales outlet (e.g., ticket machine, food and drink dispenser, . . . ), an automatic paying access control terminal (e.g., subway access terminal, bus payment terminal), or the like. The terminal TT comprises an antenna coil AC2 and is configured to perform a near field transaction with a contactless card or, for example, the processor SE via the controller NFCC by emitting a magnetic field. A transaction comprises the exchange of Application Protocol Data Units (APDU). The application data APDU comprise commands sent by the terminal TT and responses sent by the card or processor SE executing an applet corresponding to the transaction performed by the terminal TT.

When a communication link is established between the processor SE and a terminal such as the terminal TT, the terminal transmits an APDU command SELECT-AID (AID: Applet Identifier) to activate a particular applet in the processor SE. If the applet identified by the command SELECT-AID is present in the processor SE, the applet is activated. Otherwise, the processor SE (the operating system thereof) transmits an APDU response "file not found" or similar, depending on the reason of failure.

Several applications or applets may be stored in the non-volatile memory IM of the smart card processor SE. These applications may relate to payment transactions or provide access to subscription-based services such as transportation services. However, this memory has a limited size. Even if the size of the smart card memory increases with each new generation of smart cards, it may not be sufficient to meet the needs of ever-growing NFC services offered.

In addition, payment and access transactions require that the smart card, and more particularly its memory be secured. This requirement is fulfilled by software and/or hardware countermeasures aiming to prevent various attacks on the card. Software countermeasures may consist of inserting random delays while performing critical operations, and/or counting errors and erasing critical data when the error count exceeds a threshold value, and/or distributing processing of pieces of data to randomly selected elementary operations, and/or performing critical operations several times and comparing the results obtained each time, and/or performing reverse computing of a critical operation and comparing the input data with the data provided by the reverse computing. Such software countermeasures tend to increase the memory size occupied by the applet and operating system code. Hardware countermeasures aim to prevent or detect reverse engineering and/or fault injection, and/or consist in mixing processing circuits and memory. The data stored in the secure memory can be encrypted, which requires circuits for efficiently encrypting the data before they are stored in the memory, and decrypting data read in the memory. Parity bits can be added to each word stored in the memory so as to detect fault injection. Such parity bits require additional memory space and circuits for computing and controlling the values of these bits. Therefore, securing a smartcard tends to increase the size of the memory on chip and the cost of the chip.

In other aspects, even if many applets can be stored in a smart card, a limited number of applets can potentially be executed at a given time. Applet pre-selection may be performed by the user or as a function of geolocalization data, date and time, or other available information. For instance, the user may have preselected an applet within a group such as a payment applet group, for example to select a bank, a bank account or an e-purse, or to select between local and global payment. A transportation service applet may be selected within a group of available transportation applets as a function of geolocalization data. Some applets may also temporarily be deactivated for example due to incompatible protocol parameters or routing table configuration.

Therefore, deactivated applets or applets not available for selection may be removed from the smartcard memory. However, loading and installing applets in a secure smart card is a complex operation that is highly secured. This operation may be performed by an external manager such as a Trusted Service Manager TSM or the card issuer that detains cryptographic keys allowing access to a security domain of the smart card. Therefore, the removal of an applet from the memory of the smartcard is not desirable unless the applet will no longer be needed.

It is therefore desirable to enlarge the storage capacity of a secure processor such as the one integrated into a smartcard when installing new applications or applets without increasing the cost of the processor.

BRIEF SUMMARY OF THE INVENTION

Embodiments of the invention relate to a method for managing non-volatile memory space in a secure processor comprising a secure non-volatile internal memory, the method comprising steps of: selecting data elements to remove from the internal memory, generating, by the secure processor, a data block comprising the selected data elements, and a signature computed from the selected data elements using a secret key generated by the secure processor, transmitting the data block by the secure processor, and storing the transmitted data block in an external memory.

According to an embodiment, the method comprises transmitting a data block containing a data element to load in the internal memory, to the secure processor, comparing the signature read in the data block with a signature computed from the data block, and loading the data element in the internal memory only if the signature read corresponds to the signature computed.

According to an embodiment, the method comprises: requesting the secure processor to execute an application which is not stored in the internal memory but rather in a data block stored in the external memory, performing the steps of selecting data elements in the internal memory, generating a data block, transmitting the selected data in the data block and storing the data block in the external memory, transmitting to the secure processor a data block containing the application to execute, loading in the internal memory by the secure processor, the application in the transmitted data block, using if necessary space of the internal memory occupied by data stored in a data block stored in the external memory, and executing the application loaded in the internal memory.

According to an embodiment, the secure processor generates a secret key, computes a checksum from each data element to be exported in a data block, inserts each checksum in the data block, and computes a signature from data in the data block using the secret key, and prior to loading a data element from a data block in the internal memory, the secure processor checks the signature and checksum, and the data element is loaded from the data block in the internal memory only if the signature and checksum are right.

According to an embodiment, each time new data are inserted in the internal memory, the secure processor generates and transmits a data block containing the new data to store them in the external memory.

According to an embodiment, prior to being inserted in a data block, a selected data element is encrypted by the secure processor using a secret key generated by the secure processor, and prior to being loaded in the internal memory, an encrypted data element read in a data block is decrypted by the secure processor using the secret key.

According to an embodiment, each data block comprises: application data comprising data of at least one data element inserted in the data block, and administration data comprising a data block identifier, a data element descriptor for each data element in the application data, and a signature computed from the data block identifier and each data element descriptor, wherein each data element descriptor of a corresponding data element comprises a data element identifier of the corresponding data element, a data element size of the corresponding data element, a data element checksum computed from all the data of the corresponding data element, and a data element type specifying whether the corresponding data element is executable code or application data.

According to an embodiment, the secure processor attributes a new data block identifier to each data block which is generated or updated and transmitted to be stored in the external memory.

According to an embodiment, the method comprises: at a first activation of the secure processor, generating by the secure processor an initial configuration data block containing data elements configured as erasable from the internal memory, and transmitting by the secure processor the generated data block to be stored in the external memory, and restoring an initial configuration of the secure processor comprising erasing data elements configured as erasable in the internal memory, transmitting to the secure processor the initial configuration data block, and loading the data elements from the initial configuration data block in the internal memory.

According to an embodiment, the secure processor keeps a table up-to-date, containing for each data element loaded in the internal memory: an identifier of the data element, an export eligibility flag indicating if the data element is erasable from the internal memory and exportable in a data block, an export state indicating if the data element has been erased from the internal memory and exported in a data block.

According to an embodiment, the table contains authentication data for each data element in the internal memory.

Embodiments also relate to a portable device comprising a secure processor and an external non-volatile memory, the secure processor comprising an internal non-volatile secure memory, wherein the secure processor is configured to implement the method as above-defined.

According to an embodiment, the external memory is directly controlled by the secure processor, which is linked to the external memory by a bus.

According to an embodiment, the external memory is controlled by an unsecure processor linked to the secure processor by a bus.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
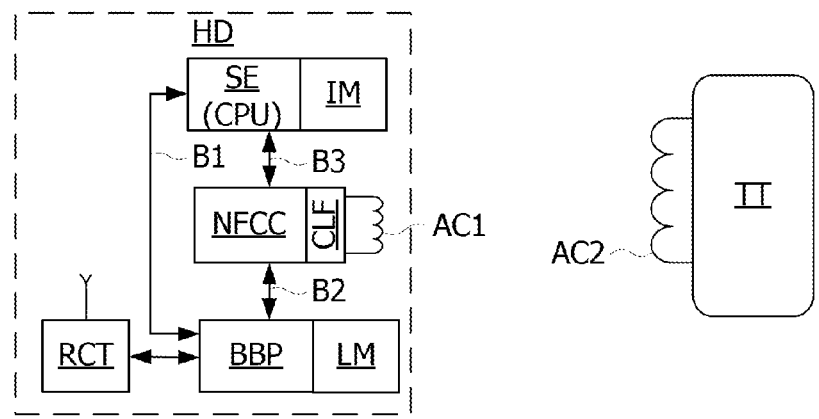
FIG. 1 previously described is a simplified block diagram of an NFC transaction system including a portable device equipped with a secure transaction processor.
Figure 2A:
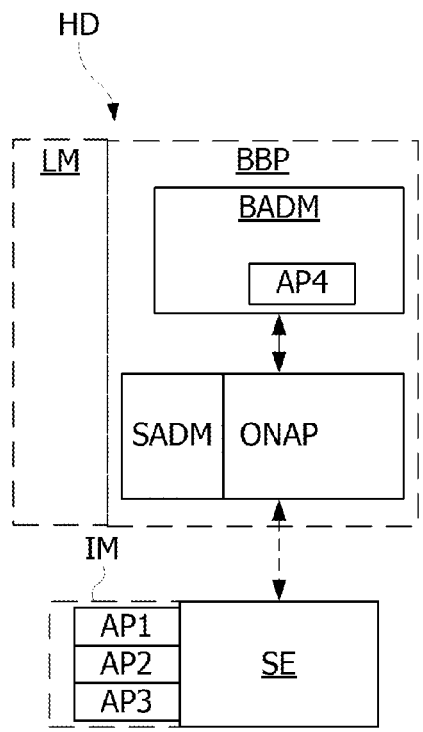
FIGS. 2A to 2C are simplified block diagrams of a software configuration of a portable device including a secure processor, when installing a new applet in the secure processor or retrieving an already installed applet, according to embodiments.
Figure 2B:
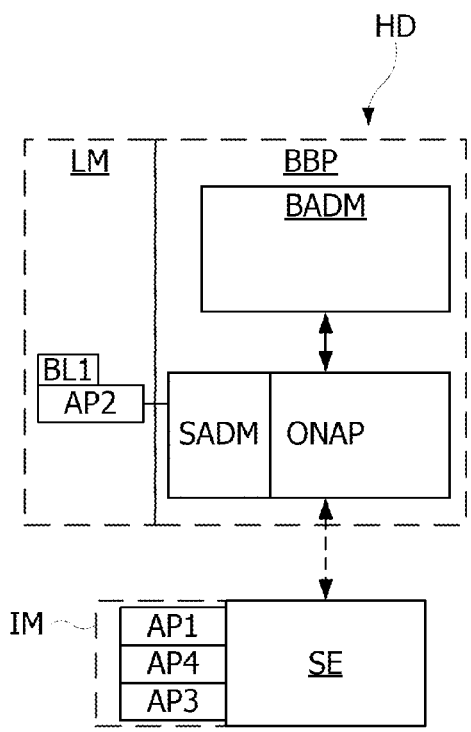
Figure 2C:
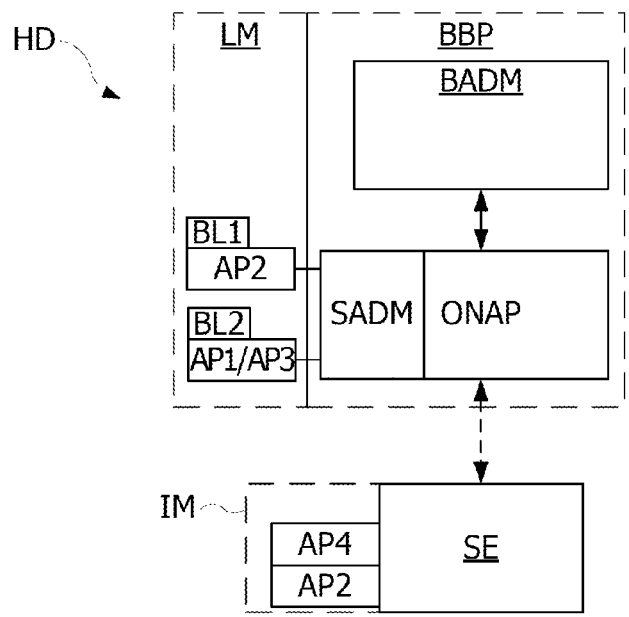

FIGS. 2A-2C illustrate a simplified block diagram of a software configuration of a portable device, such as the device HD shown in FIG. 1. FIGS. 2A-2C show a main (or baseband) processor BBP and a secure processor SE of the portable device HD. The processor BBP is coupled to a non-volatile memory LM, and the processor SE comprises a secure non-volatile memory IM. The processor SE may be linked to the processor BBP either directly (by the link B1) or via the controller NFCC. The processor SE may be linked to the controller NFCC through a wire or wireless link. The processor BBP executes an application BADM that manages the installation of applications or applets in the processor SE, and an application ONAP that enables communications between applications executed by the processor BBP and the processor SE. In the example of FIG. 2A, three applications AP1, AP2, AP3 are loaded in the memory IM of the processor SE. The application ONAP is generally a part of the operating system of the processor BBP and the application BADM may also be a part of this operating system. The operating system of the processor SE may be a JavaCard or Multos operating system, or a native operating system such as IGOS developed by the Applicant.

According to an embodiment, the application ONAP comprises a function SADM for removing and restoring applications in the processor SE as a function of the user's needs. In FIG. 2A, a new application AP4 downloaded to the processor BBP is to be loaded and installed in the processor SE. However, the memory IM has insufficient free memory space to receive the application AP4. The function SADM detects that the free memory space of the memory IM is too small to receive the application AP4 and selects an application in the memory IM to remove from this memory. Thus, the function SADM sends a command to the processor SE to remove the application AP2. It should be noted that the user may also select an application and request to remove the selected application.

In FIG. 2B, processor SE executes this command by encapsulating the application AP2 in a data block BL1 and transmitting this block to the processor BBP. The block BL1 is received by the application SADM executed by the processor BBP. The application SADM stores the received block BL1 in the memory LM. Then the function SADM notifies the application BADM that there is enough free space in the memory IM to load and install the application AP4. The application AP4 is then transmitted to the processor SE which stores the application AP4 in the memory IM. The application AP4 is now ready to be installed and executed by processor SE.

The application AP4 has been transmitted by a trusted entity and downloaded to the processor BBP by the application BADM for example using a secure channel. The application AP4 may be signed using a private or secret key of the processor SE and/or encrypted using a public or secret key of the processor SE, so that the processor SE may check the authenticity of the application AP4. If the application AP4 is encrypted using a secret, private or public key of the processor SE, only the processor SE can install and execute the application AP4. The application BADM may be consistent with a proprietary system or consistent with the GlobalPlatform standard (see http://www.globalplatform.org).

In FIG. 2C, the execution of the application AP2 by the processor SE is required, for example by the user or by reception of a SELECT command at the beginning of an NFC transaction performed between the terminal TT and the processor SE via the controller NFCC. Since the application AP2 has been removed from memory IM which has insufficient free space to receive the requested application AP2, the function SADM first requests exportation of data stored in the memory IM to free enough memory space, and then requests that the block BL1 containing application AP2 to be imported in the memory IM. In the example of FIG. 2C, both the applications AP1 and AP3 are selected to be exported, since selecting only one or the other of applications AP1 and AP3 is insufficient to free up enough memory space for application AP2. Thus, the function SADM sends a request to the processor SE to export the applications AP1 and AP3. The processor SE generates a data block BL2 containing the applications AP1 and AP3 and transmits it to the processor BBP. The function SADM receives and stores the block BL2 in memory LM. The memory space where are stored the applications AP1 and AP3 is now usable for storing other data. As there is now enough space to load application AP2 in the memory IM, the application SADM transmits the block BL1 to the processor SE. Then the processor SE restores the application AP2 in the memory IM from the received block BL1 and activates the application AP2.

In this manner, the applications that can be installed and executed by the secure processor are not limited by the size of its secure memory IM.

The data blocks stored in the memory EM may be backed up outside the device HD in a remote server, so as to avoid re-installation of applications in lost data blocks, which may be a complex operation (personalization of the applets may require to be performed by different service providers). The back-up of data blocks may be performed in an SD Card which can be connected to the processor BBP. The code of applet instances may be also reloaded by a trusted entity and re-connected to the applet instances that have remained in the memory IM. To be sure that the same code as the original one has been reloaded, code authentication information is saved in the table SREG (either for each applet instance or only for the code elements) and verified after loading of the code and before logically linking the remaining instances to the loaded code.

Figure 3:
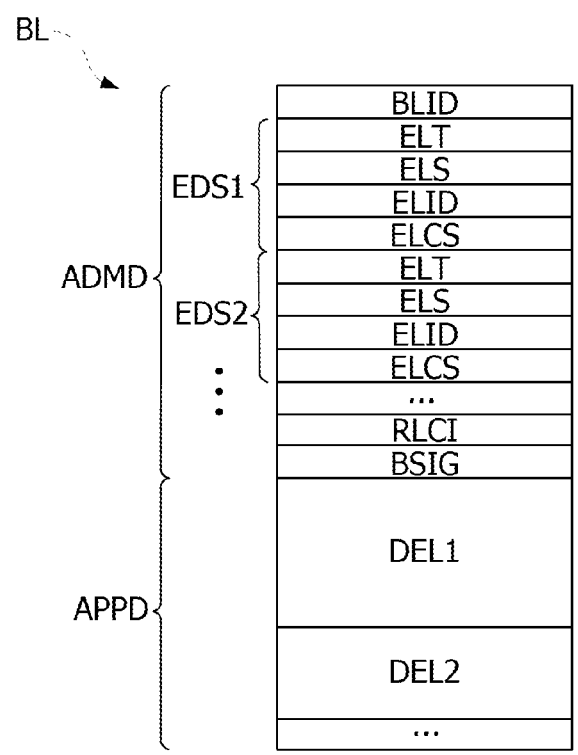
FIG. 3 illustrates a data block structure used by a secure processor, according to an embodiment.

FIG. 3 illustrates the structure of a data block BL (BL1, BL2). The block BL comprises an administration data part ADMD and an application data part APPD for receiving data of one or more data elements DEL1, DEL2. A data element may be an executable file containing the executable code section of an application. A data element may also be an application instance, containing applicative data of an application, such as personalization data, application keys, dynamic data generated by the application such as counters, . . . . Thus a data element may be an application instance in its current dynamic state. When such a data element is restored in the memory IM, the application instance it contains recovers its previous state as if it were not removed from the memory IM. A data element may be also a "security domain" containing keys and configuration data (associated applets, privileges, etc.).

The administration data part ADMD comprises a block identifier BLID, element descriptors EDS1, EDS2, . . . for each data element DEL1, DEL2 in the application data part APPD, and a block signature BSIG. The element descriptors EDS1, EDS2 are not necessary grouped in the part ADMD but may be each associated with their corresponding data element DEL1, DEL2. The part ADMD may also comprise relocation data RLCI such as an address from which the data elements in the part APPD are to be loaded in the memory IM. Each element descriptor EDS1, EDS2 comprises an element type ELT, an element size ELS, an element identifier ELID, and an element checksum ELCS. The element type ELT specifies whether the corresponding data element DEL1, DEL2 in the part APPD is code or data. The element size specifies the size of the corresponding data element DEL1, DEL2. The element identifier ELID specifies an identifier of the corresponding data element DEL1, DEL2. The element checksum ELCS contains a checksum of the corresponding data element DEL1, DEL2. This checksum is computed by applying for example a hash function such as SHA-1 to the data of the data element. The checksum may be further encrypted using a secret key generated and stored by the processor SE before being written in the block.

The block signature BSIG may be computed by applying a symmetric cryptographic function such as AES (Advanced Encryption Standard), using a secret key generated by the processor SE, to the administration data part ADMD, for example. The signature BSIG may be also computed using an asymmetric cryptographic function using a private key. The secret key has a length of 128 or 192 bits for example. The signature BSIG is added to the block BL before the block is transmitted. The use of such a signature aims to ensure the integrity and authenticity of each data element DEL1, DEL2 stored in the part APPD. When a data element DEL1, DEL2 is loaded from a block BL in the memory IM, the signature BSIG of the block and the checksum ELCS of the element are verified, i.e. computed from the block and the data element, and the computation results compared with the ones stored in the data block. If a checksum or the signature is false, the data element is not loaded in the memory IM and an error signal is generated. In this manner, the data blocks are protected against alteration when stored in an unprotected environment. In addition thanks to the use of the signature BSIG, the processor SE cannot load a data block generated by another processor in the memory IM.

It should be noted that a key generation function, a hash function, and signature generation and verification functions are generally present in a secure processor and thus may be used to generate the secret key and to generate and verify the checksums and the signature in a block BL.

Confidentiality of the data in a data block BL can be also obtained by encrypting the application data part APPD considered as a single block, or each data element DEL1, DEL2 separately, using a secret key and an encryption function already present in the processor SE, for instance a symmetric encryption function. When an encrypted data element in a block BL is to be loaded in the memory IM, it can be decrypted using a decryption function also present in the processor SE.

It should be noted that the secret key used for signature computation and possibly for encryption and decryption is generated by the processor SE and may be kept inside the processor SE for instance in the memory IM. Therefore, the protection of the data exported in a block data BL may be as strong as if the data were not exported.

Figure 4:
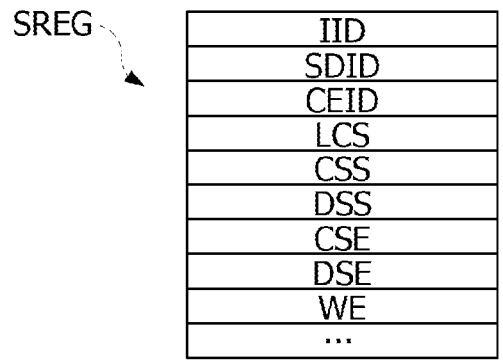
FIG. 4 illustrates a table structure used by the secure processor according to an embodiment.

In order to manage applications stored in the memory IM and/or in a block BL in the memory LM, the processor SE keeps up-to-date a table SREG stored in the memory IM or another non-volatile memory of the processor SE. FIG. 4 shows the structure of each entry of the table SREG. The table SREG comprises an entry for each data element, i.e. application (code) or application instance (data) previously installed in the processor SE or other data that may be useful to store in an external memory. Each entry of the table SREG comprises fields storing an instance or data identifier IID, a security domain identifier SDID, a code element identifier CEID, a life cycle state LCS, a code swap state CSS, a data swap state DSS, and flags for code swap eligibility CSE, data swap eligibility DSE, and wipe eligibility WE. Eligibility fields are set for example during loading or installation of the corresponding data element, to specify whether the data element may be removed from the memory IM. If the data element is of the code type, then the instance identifier field IID, the data swap state field DSS, and the eligibility field DSE are not used (left empty). If the data element is of the data type, then the instance identifier field IID and the code element identifier field CEID respectively receive the element identifiers ELID of the instance (data) and the application (code) using the data element, and the code swap eligibility field DSE is left empty. The code swap state field CSS specifies whether the application code of the element CEID has been exported in a data block BL. The data swap state field DSS specifies whether the data IID has been exported in a data block BL. If a code or a data element of an application instance is stored in a block BL, the corresponding code or data swap state fields CSS, DSS contain the data block identifier BLID where the corresponding data element DEL1, DEL2 is stored. If the code or data swap eligibility flag is set to false, the corresponding element cannot be exported nor removed from the memory IM and exported in a data block BL. The table SREG is updated each time a new data element is exported in a data block BL.

According to the Global Platform specifications (version 2.2 or higher), the life cycle states of a data element (field LCS) can have the states INSTALLED for an installed but not yet executable application, SELECTABLE for an installed and executable application, and LOCKED for an application which is prevented from being executed. It should be noted that the field LCS (and other fields related to GlobalPlatform) may be updated as if the corresponding application were present in the memory IM.

Figure 5:
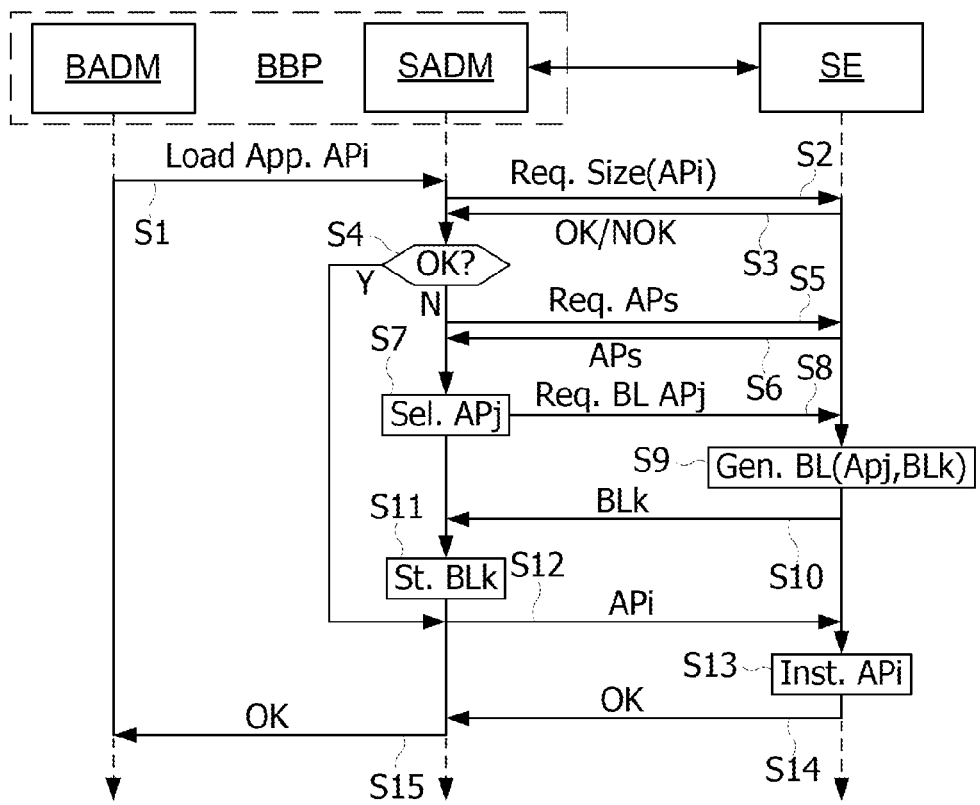
FIG. 5 is a flow chart illustrating a sequence of steps performed by the portable device when installing an application in the secure processor, according to an embodiment.

FIG. 5 is a flow chart illustrating a sequence of steps S1 to S15 performed by the portable device HD when loading a new application in the secure processor SE, according to an embodiment. At step S1, the application BADM executed by the processor BBP transmits a command to load a new application APi in the processor SE to the function SADM of the application ONAP. At step S2, the function SADM receives this command and transmits to the processor SE a request to determine whether the available memory space in the memory IM is sufficient to receive the application to load APi. This request may specify the size of the application APi. At step S3, the processor SE transmits a response to this request. This response may simply specify whether there is enough memory space to load the application APi taking into account the size transmitted at step S2. At step S4, if the response from the processor SE indicates that there is enough space in the memory IM to load the application APi, the steps S12 to S15 are executed, otherwise the steps S5 to S15 are executed.

At step S5, the function SADM transmits to the processor SE a request for an identifier list of the applications installed in the processor SE. At step S6, the processor SE reads the table SREG and transmits to the processor BBP the response to the request received at step S5. At step S7, the function SADM determines from the response received at step S6, which data element(s) (code and/or data) APj can be removed from the memory IM to free up enough memory space for the application APi to load. At step S8, the function SADM transmits a command to generate a data block comprising the data element(s) APj selected at step S7 to the processor SE. This command comprises the identifier(s) of the data element(s) selected at step S7. At step S9, the processor SE receives this command and generates a data block BLk including the requested data element(s) APj. At step S10, the block BLk is transmitted to the processor BBP. At step S11, the function SADM stores the received block in the memory LM. At step S12, the application to load APi is transmitted in one or several messages from the function SADM to the processor SE. At step S13, the application APi is received and loaded in the memory IM and installed. However installation of the application may occur later. At step S14, the processor SE transmits a message indicating the result of the installation of the application APi to the processor BBP. This message is received by the function SADM and transmitted to the application BADM. The user can thereby know whether the application is loaded and installed in the processor SE.

At steps S2 and S3, the function SADM may additionally request the size of the available space in the memory IM and the processor SE may respond by transmitting this size. Thus, the function SADM may determine from the size of the application APj if there is enough free space in the memory IM to load the application APi. Alternatively, the steps S5 and S6 may be performed instead of steps S2 and S3. Thus at step S3, the processor SE transmits a list containing the installed applications identifiers and specifying the size of each application to the processor BBP. The function SADM can thus determine the size of the remaining available space in the memory IM from the features of the processor SE (size of memory IM, size of the operating system stored in memory IM).

The selection of a data element to remove from the memory IM (step S7) may be performed by the application BADM executed by the processor BBP, as a function of a user choice, using geolocalization data of the portable device HD, as a function of time and date or information received by the portable device HD, as a function of the state (INSTALLED, SELECTABLE, LOCKED), and/or size of each application installed in the processor SE, and/or as a function of the presence of the application identifiers in a routing table. An application (code) without instance (data) or that has not been executed for a long time may be also selected in priority.

The selection command transmitted at step S8 may specify an application identifier AID to designate a code element and that all instances related to this application identifier (depending on the code element) are to be removed from memory IM and/or inserted in a single data block.

According to an embodiment, before generating a data block BL at step S5, the processor SE determines if a data block BLk exists containing a data element APj to remove from the memory IM and to export to the processor BBP. Verification can be made to determine whether the data block BLk still exists in memory LM and has not been lost, for instance due to an operating system update, a crash, etc. If the data block no more exists in the memory LM, it could be retrieved using a backup facility (TSM, cloud, MicroSD) before allowing the processor SE to erase the data element in memory IM. If such a data block BLk exists, the processor SE checks whether the data elements DEL1, DEL2 stored in the data block BLk have changed in the memory IM after the data block BLk was generated. This operation may be performed by comparing the checksums ELCS stored in the data block with checksums computed with corresponding data elements stored in the memory IM. If the data elements in the data block BLk have not changed, the data block is not generated nor sent again to the processor BBP. The memory space occupied by these data elements in the memory IM is simply made available or erased so that other data elements may be stored. If the data block contains data elements that have been modified in memory IM, the data block is updated with the modified data elements and transmitted to the processor BBP.

Figure 6:
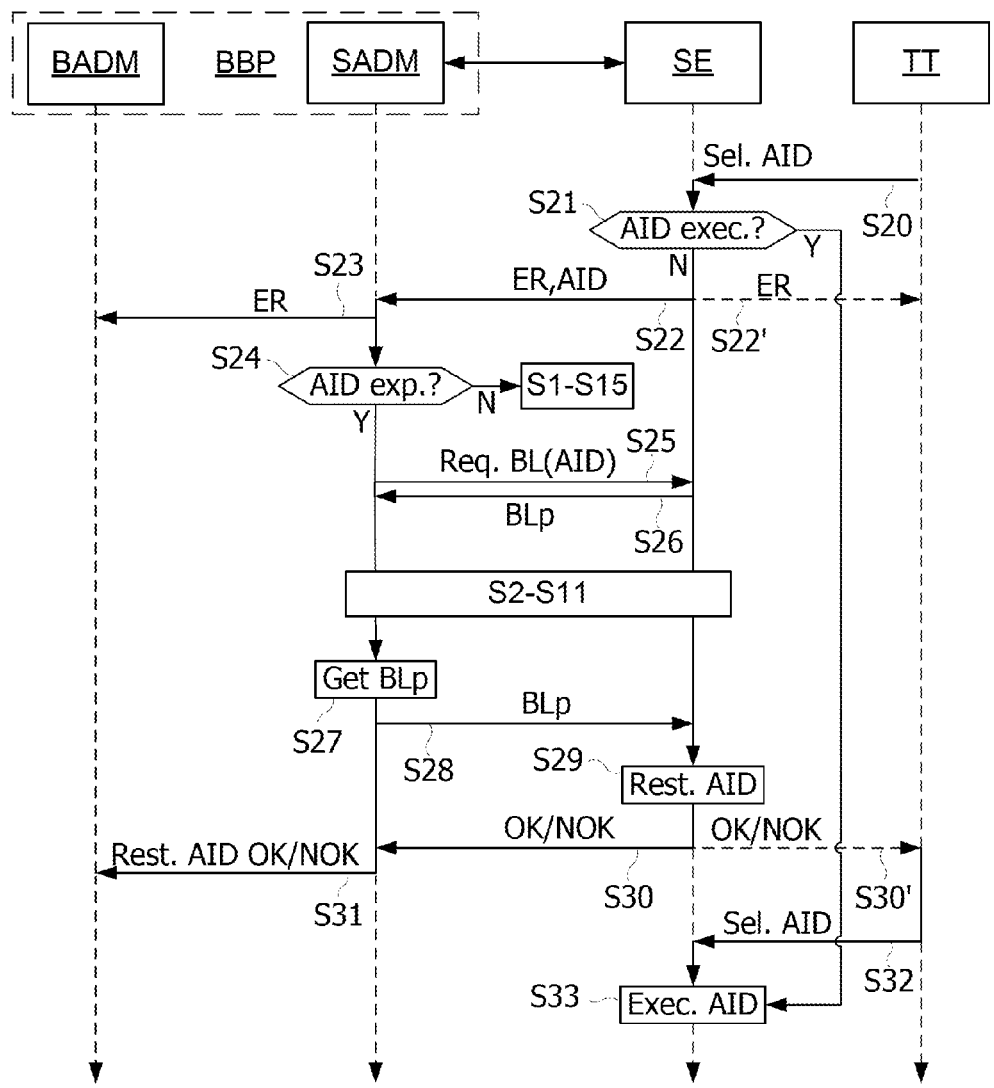
FIG. 6 is a flow chart illustrating a sequence of steps performed by the portable device when the secure processor receives a command to execute an application, according to an embodiment.

FIG. 6 is a flow chart illustrating a sequence of steps S20 to S33 performed by the portable device when the secure processor receives from a transaction terminal TT a command to execute an application, according to an embodiment. At step S20, the processor SE receives from the terminal TT a selection command to execute an application identified by an identifier AID provided in the command. This selection command may be for example received from an NFC transaction terminal TT via the controller NFCC. At step S21, the processor SE reads the table SREG to determine whether the application AID is executable, installed but exported, or not installed. If the application AID is executable, the application AID is executed at step S33. If the application is not installed or installed but exported in a data block BL, steps S22 to S24 are executed. At step S22, the processor SE transmits an error message containing the identifier AID to the processor BBP. At a step S22', the processor SE may also transmit an error message to the terminal TT. Thus the terminal may know that it has to transmit again the selection command. At step S23, the function SADM receives this message and transmits it to the application BADM so that the user may be notified of the absence of the application requested at step S20. At step S24, if the application AID is not installed, the sequence of steps S1 to S15 of FIG. 5 may be executed, otherwise, the application AID is already installed but not present in the memory IM. In this latter case, the function SADM transmits a command specifying the identifier AID of the application to execute and requesting the data block identifier BLID (provided in the field DSS or CSS) where the application AID is stored to the processor SE (step S25). At step S26, the processor SE transmits a response containing the requested block identifier BLp read in the table SREG. Steps S2 to S11 are then executed in order to free up, if necessary, memory space to load the block BLp in the memory IM. Steps S27 to S33 are then executed. At step S27, the function SADM retrieves the block BLp in the memory LM. At step S28, the retrieved block BLp is transmitted to the processor SE. At step S29, the processor SE restores the application AID from the block received BLp. At step S30, the processor SE transmits an acknowledge message indicating whether the restoration of the application AID in the memory IM succeeded to the processor BBP. At a step S30', the processor SE may also transmit an acknowledge message to the terminal TT. At step S31, the function SADM transmits the received acknowledge message to the application BADM. This message may be notified by the application BADM to the user to indicate that the portable device HD should again be brought into proximity of the terminal TT in order to activate the application AID. At step S32, the terminal TT transmits again the selection command to the processor SE to activate the application AID. At step S33, the processor SE executes the application AID. If steps S22' and/or S30' are performed, steps S22 and S30 can be performed by a spy function of the controller NFCC which checks whether the selection command has failed and when the required restoration is performed and notifies the processor BBP. In addition, steps S25 and S26 may be omitted if the function SADM keeps up-to-date a table establishing correspondence between data element identifiers and data block identifiers.

According to an embodiment, a data element selected to be exported (field CSE or DSE set to true) may be systematically exported by the processor SE, even if it has not been updated since it was exported in a data block to the processor BBP. Thus when a data block BL is read in the memory LM and successfully transmitted to the processor SE, it can be erased from the memory LM.

Figure 7:
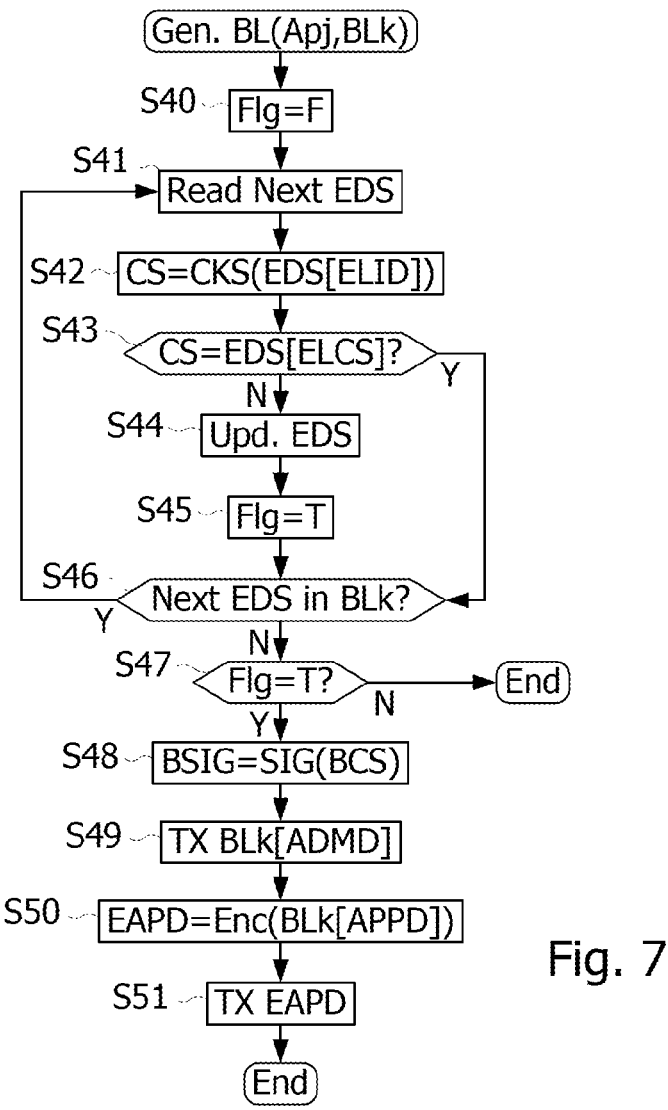
FIG. 7 is a flow chart illustrating a sequence of steps performed by the secure processor when there is insufficient space in the secure memory to load and/or install an application, according to an embodiment.

FIG. 7 is a flow chart illustrating steps S40 to S51 performed by the processor SE, according to an embodiment. These steps are executed when the processor SE is requested to generate a data block with an element APj already stored in a data block BLk in memory LM. These steps are executed for example at step S9. Before executing these steps, the processor SE receives the block identifier BLID of the block BLk and the ADMD part of the block BLk. At step S40, the processor SE sets a flag Flg to false. Then the steps S41 to S43 are executed with each element descriptor EDS in the data block BLk. At step S41, the processor SE reads the first (at a first iteration) or next element descriptor EDS in the data block BLk. At step S42, the processor SE computes the checksum of the data element in the memory IM, as identified by the element identifier ELID read in the element descriptor EDS at step S41. At step S43, the processor SE compares the checksum stored in the element descriptor EDS read at step S41 with the checksum computed at step S42. If the checksum read is equal to the checksum computed, it means that the data element DEL in the data block BLk has not been updated in the memory IM since the data block was generated. Steps S41 to S43 are then repeated with the next element descriptor in the data block if one exists (step S46).

If at step S43 the checksum read is not equal to the checksum computed, the steps S44 to S46 are executed. At step S44, the data block BLk is updated with the corresponding data element stored in the memory IM. At step S45, the flag Flg is set to true. At step S46, if another element descriptor EDS1, EDS2 is present in the data block BLk, steps S41 to S46 are repeated with this element descriptor, otherwise step S47 is executed. At step S47, the flag Flg is tested. If the flag Flg is set to false, meaning that the data block has not been updated and shall not be transmitted to processor BBP, the sequence of steps ends. If at step S47, the flag Flg is set to true, steps S48 to S51 are executed to update the data block BLk and to transmit it to the processor BBP. At step S48, the signature BSIG of the data block administration data part ADMD is computed using the secret key and the obtained signature BSIG is stored in the data block. At step S49, the thus-obtained administration data part ADMD of the block BLk is transmitted to the processor BBP. At step S51, the application data part APPD of the block BLk is transmitted to the processor BBP after being encrypted at step S50 if required.

The sequence of steps of FIG. 7 may be simplified if the data blocks are chosen to store only one data element (code or data).

The memory IM may also store, for instance in the table SREG, the data element checksums ELCS as computed when exported in a data block. In this manner, steps S41 to S46 may only consist in checking whether one of the data elements ELID stored in the data block BLk (i.e. its checksum) have changed. If one data element has changed, the data block BLk is generated again.

According to an embodiment, each time a new element (code or data), set to exportable (data CSE or DSE set to true) in the table SREG, is loaded or updated in the memory IM, the processor SE generates or updates a data block BL containing this new element. The new or updated data block BL is then transmitted to the processor BBP to be stored in the memory LM. The processor SE may execute the sequence of FIG. 7 to update a data block. In this manner, when an exportable data element is to be erased in the memory IM, it is already stored in a data block in the memory LM and has not to be exported in a data block. Thus when the processor SE is requested to execute an application which is already installed but not stored in the memory IM (sequence of FIG. 6), the processor SE just has to request the data block BL containing the requested application from the processor BBP (steps S25 to S28) without exporting another data block. The processor SE extracts the requested application from the received data block and loads it in a place in the memory IM occupied by data elements selected to remove specified by the application BADM or function SADM (step S29). The steps S9 to S11 in the sequence of FIG. 6 do not need to be executed. Therefore, the time required to generate such a data block can be saved. Since all data elements are stored in a data block in the memory LM, the fields CSS and DSS in the table SREG may be used to determine whether the corresponding data element is in the memory IM.

When the function SADM receives a data block BL from the processor SE, it checks in the memory LM whether another block contains a data element with the same identifier ELID. If such a data block exists, it is erased and replaced by the received data block in the memory LM.

According to an embodiment, each time a data block BL is generated or updated it receives a new data block identifier BLID and the table SREG is updated accordingly. The data block identifiers BLID may be provided by a counter which is incremented for each new or updated data block. In this manner, replay of an old data block is prevented.

According to an embodiment, when the processor SE is connected to the processor BBP and booted for the first time, the processor SE generates a data block containing an initial configuration (factory settings) of the processor SE. This initial configuration comprises all the data elements (code and data) in the memory IM set to erasable (field WE set to true in the table SREG). The generated data block is then transmitted to the processor BBP. When it is desired to restore the initial state of the processor SE, all application data (including application data related to the operating system) and code associated in the register SREG with a field WE set to true are erased from memory IM. The application data related to the operating system are data which are generated when the application is loaded or installed and which are required to execute the application. These data are not erased from the memory IM when the application is exported in a data block. The data block containing the initial configuration of the processor SE is then transmitted by the processor BBP to the processor SE and loaded in the memory IM. In this manner, the memory IM of the processor SE can be reset to its initial state.

Figure 8:
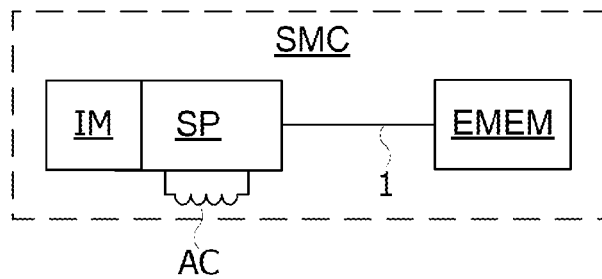
FIG. 8 is a simplified block diagram of a smartcard which can be configured to free space in a secure memory, according to an embodiment.

FIG. 8 is a block diagram of a secure chip SMC according to an embodiment. The chip SMC integrates a secure processor SP comprising an internal secure non-volatile memory IM. According to an embodiment, the secure chip integrates or is connectable to a non-secure non-volatile memory EMEM linked to the processor SP by a bus 1. The processor SP may be a smart card, an SD (Secure Digital) card, a USB (Universal Serial Bus) token, comprising means for protecting assets such as data, keys, and applications from physical or software attacks. The bus linking the processor SP and the memory EMEM can be of the type ISO 7816, SWP (Single Wire Protocol), I2C (Inter Integrated Circuit bus), SPI (Serial Peripheral Interface bus). The processor SP may comprise a contactless communication interface comprising an antenna circuit AC and/or a contact interface for example of the type ISO 7816. The memory EMEM can be a low cost and fast non-volatile memory such as a flash memory.

The processor SP is configured to save data elements stored in the memory IM in data blocks BL it generates, directly in the memory EMEM, and to restore data elements from data blocks read directly in the memory EMEM. Therefore, the processor SP is configured to perform all the previously-described steps executed by the processor SP and the function SADM, for instance the steps of the sequences of FIGS. 5, 6, and 7.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

In particular, the present invention is not limited to a mobile or smart phone comprising an NFC interface for communication with an NFC terminal, but rather cover any portable device comprising a secure processor having a secure internal non-volatile memory and a communication circuit that can be used for receiving application data and code executable by the secure processor from an external entity such as a trusted entity. The communication between the processor SE, SP and the transaction terminal TT may be performed by means of an UHF, Bluetooth, WiFi or ZigBee wireless link or exclusively by means of a wire link.

The above-described method is not necessarily implemented using the GlobalPlatform standard, but may be implemented using a proprietary system.

Further, an exported data block may be never loaded in the internal memory, if the data elements exported in the data block are never reused by the secure processor.

Further, although involving complex computation algorithms, the signature may be computed from the whole content of a data block, so that checksum computations may be unnecessary.

Further the above disclosed method may be restricted to exporting code elements only. This restriction reduces the complexity of data block management relative to the contained data elements. When a code element is exported, all related application instances remain in the memory IM. In addition the fields DSS and DSE in the table SREG are not necessary.

Further in a use case where a data block containing the code of an application is lost in the external memory and cannot be restored, reloading the code of the application using the standard GlobalPlatform mechanism is performed so as to restore the links between the code of the application reloaded and the instances of the application remaining in the internal memory. A verification that the reloaded code is the same as the "lost" one may be performed. To this purpose one or more code authentication data (DAP blocks as specified in GlobalPlatform Card Specification v2.1.1 or v2.2.1) may be saved in memory IM, for instance in the table SREG.

The invention claimed is:

1. A method for managing non-volatile memory space in a secure processor comprising a secure non-volatile internal memory, the method comprising steps of:

associating an export eligibility flag with each data element in the internal memory, each eligibility flag indicating whether the associated data element is erasable from the internal memory and exportable in a data block, each time new data are inserted into the secure non-volatile internal memory, if the new data are associated with an export eligibility flag indicating that the new data are erasable, exporting the new data in one or more data blocks to an external memory, and for each data block to be exported:

generating, by the secure processor, the data block from the new data, and a signature computed from the data inserted into the data block using a secret key generated by the secure processor, transmitting the data block by the secure processor to store the data block in an external memory, and storing the transmitted data block in the external memory.

2. The method according to claim 1, comprising transmitting a data block containing a data element to load in the internal memory, to the secure processor, comparing the signature read in the data block with a signature computed from the data block, and loading the data element in the internal memory only if the signature read corresponds to the signature computed.

3. The method according to claim 2, comprising:

requesting the secure processor to execute an application which is not stored in the internal memory but rather in a data block stored in the external memory, selecting data elements in the internal memory, transmitting to the secure processor a data block containing the application to execute, loading in the internal memory by the secure processor, the application in the transmitted data block, using if necessary space of the internal memory occupied by the selected data elements, and executing the application loaded in the internal memory.

4. The method according to claim 1, wherein the secure processor computes a checksum from each data element to be exported in a data block, inserts each checksum in the data block, and computes a signature from data in the data block using the secret key, and prior to loading a data element from a data block in the internal memory, the secure processor checks the signature and checksum, and the data element is loaded from the data block in the internal memory only if the signature and checksum are right.

5. The method according to claim 1, wherein prior to being inserted in a data block, a selected data element is encrypted by the secure processor using a secret key generated by the secure processor, and prior to being loaded in the internal memory, an encrypted data element read in a data block is decrypted by the secure processor using the secret key.

6. The method according to claim 1, wherein each data block comprises:
application data comprising data of at least one data element inserted in the data block, and
administration data comprising a data block identifier, a data element descriptor for each data element in the application data, and a signature computed from the data block identifier and each data element descriptor, wherein each data element descriptor of a corresponding data element comprises a data element identifier of the corresponding data element, a data element size of the corresponding data element, a data element checksum computed from all the data of the corresponding data element, and a data element type specifying whether the corresponding data element is executable code or application data.

7. The method according to claim 6, wherein the secure processor attributes a new data block identifier to each data block which is generated or updated and transmitted to be stored in the external memory.

8. The method according to claim 1, comprising:
at a first activation of the secure processor, generating by the secure processor an initial configuration data block containing data elements configured as erasable from the internal memory, and transmitting by the secure processor the generated initial configuration data block to be stored in the external memory, and
restoring an initial configuration of the secure processor comprising erasing data elements configured as erasable in the internal memory, transmitting to the secure processor the initial configuration data block, and loading the data elements from the initial configuration data block in the internal memory.

9. The method according to claim 1, wherein the secure processor keeps a table up-to-date, containing for each data element loaded in the internal memory:
an identifier of the data element,
the export eligibility flag,
an export state indicating if the data element has been erased from the internal memory and exported in a data block.

10. The method according to claim 9, wherein the table contains authentication data for each data element in the internal memory.

11. A portable device comprising a secure processor and an external non-volatile memory, the secure processor comprising an internal non-volatile secure memory, wherein the secure processor is configured to:
generate a secret key,
associate an export eligibility flag with each data element in the internal memory, each eligibility flag indicating whether the associated data element is erasable from the internal memory and exportable in a data block,
each time new data are inserted into the non-volatile secure internal memory, if the new data are associated with an export eligibility flag indicating that the new data are erasable, export the new data in one or more data blocks to an external memory, and for each data block to be exported:
generate the data block comprising the new data, and a signature computed from the data inserted into the data block using the secret key, and
transmit the data block to store the data block in the external memory.

12. The device according to claim 11, wherein the external memory is directly controlled by the secure processor, which is linked to the external memory by a bus.

13. The device according to claim 11, wherein the external memory is controlled by an unsecure processor linked to the secure processor by a bus.

14. The device according to claim 11, wherein the secure processor is configured to:
receive a data block containing a data element to load in the internal memory,
compute a signature from the received data block,
compare a signature read in the data block with the signature computed from the data block, and
load the data element in the internal memory only if the signature read corresponds to the signature computed.

15. The device according to claim 14, wherein the secure processor is configured to:
receive a request to execute an application which is not stored in the internal memory but rather in one or more data blocks stored in the external memory,
select data elements in the internal memory,
request a data block containing the application to execute,
receive the data block containing the application to execute,
load in the internal memory, the application in the transmitted data block, using if necessary space of the internal memory occupied by the selected data elements, and
execute the application loaded in the internal memory.

16. The device according to claim 11, wherein the secure processor is configured to:
compute a checksum from each data element to be exported in a data block,
insert each checksum in the data block, and
compute a signature from data in the data block using the secret key, and prior to loading a data element from a data block in the internal memory check the signature and checksum, and
load the data element from the data block in the internal memory only if the signature and checksum are right.

17. The device according to claim 11, wherein the secure processor is configured to:
encrypt a selected data element using the secret key, and insert the encrypted data element in a data block.

18. The device according to claim 11, wherein the secure processor is configured to:
read an encrypted data element in a received data block,
decrypt the encrypted data element read in the data block, using the secret key, and
load the decrypted data element in the internal memory.

19. The device according to claim 11, wherein each data block comprises:
application data comprising data of at least one data element inserted in the data block, and
administration data comprising a data block identifier, a data element descriptor for each data element in the application data, and a signature computed from the data block identifier and each data element descriptor, wherein each data element descriptor of a corresponding data element comprises a data element identifier of the corresponding data element, a data element size of the corresponding data element, a data element checksum computed from all the data of the corresponding data element, and a data element type specifying whether the corresponding data element is executable code or application data.

20. The device according to claim 19, wherein the secure processor is configured to attribute a new data block identifier to each data block which is generated or updated, and transmitted to be stored in the external memory.

21. The device according to claim 20, wherein the secure processor is configured to:
- at a first activation of the secure processor, generate an initial configuration data block containing data elements configured as erasable from the internal memory, and transmit the generated initial configuration data block to be stored in the external memory, and
- restore an initial configuration of the secure processor, comprising erasing data elements configured as erasable in the internal memory, receiving the initial configuration data block, and loading the data elements from the initial configuration data block in the internal memory.

22. The device according to claim 11, wherein the secure processor is configured to keep a table up-to-date, containing for each data element loaded in the internal memory:
- an identifier of the data element,
- the export eligibility flag, and
- an export state indicating if the data element has been erased from the internal memory and exported in a data block.

23. The device according to claim 22, wherein the table contains authentication data for each data element in the internal memory.

* * * * *